April 19, 1938.  A. BROWN  2,114,649
POULTRY FEEDER
Filed March 2, 1937  2 Sheets-Sheet 1
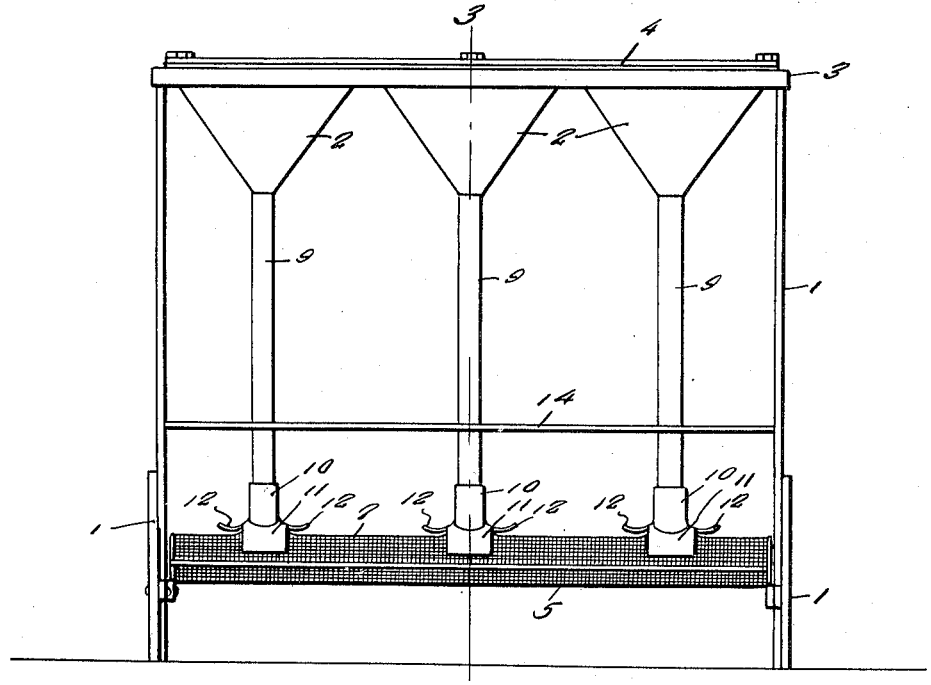
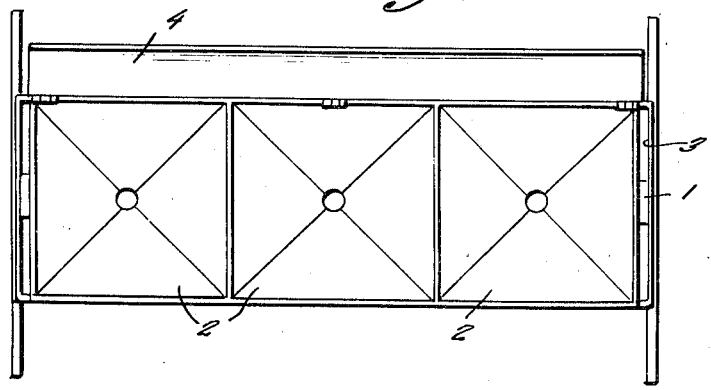
Inventor
Albert Brown
By Clarence A. O'Brien
Hyman Berman
Attorneys April 19, 1938.  A. BROWN  2,114,649
POULTRY FEEDER
Filed March 2, 1937  2 Sheets-Sheet 2

Inventor
Albert Brown

By Clarence A. O'Brien
Hyman Berman
Attorneys

Patented Apr. 19, 1938

2,114,649

UNITED STATES PATENT OFFICE 2,114,649

POULTRY FEEDER

Albert Brown, Lecompte, La.

Application March 2, 1937, Serial No. 128,659

5 Claims. (Cl. 119—53)

The present invention relates to new and useful improvements in poultry feeders and has for its primary object to provide, in a manner as hereinafter set forth, a device of this character embodying novel means operable by the chickens when feeding for controlling the supply of feed.

Other objects of the invention are to provide a poultry feeder of the aforementioned character which will be comparatively simple in construction, strong, durable, sanitary, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a poultry feeder constructed in accordance with the present invention.

Figure 2 is a view in top plan thereof.

Figure 3:
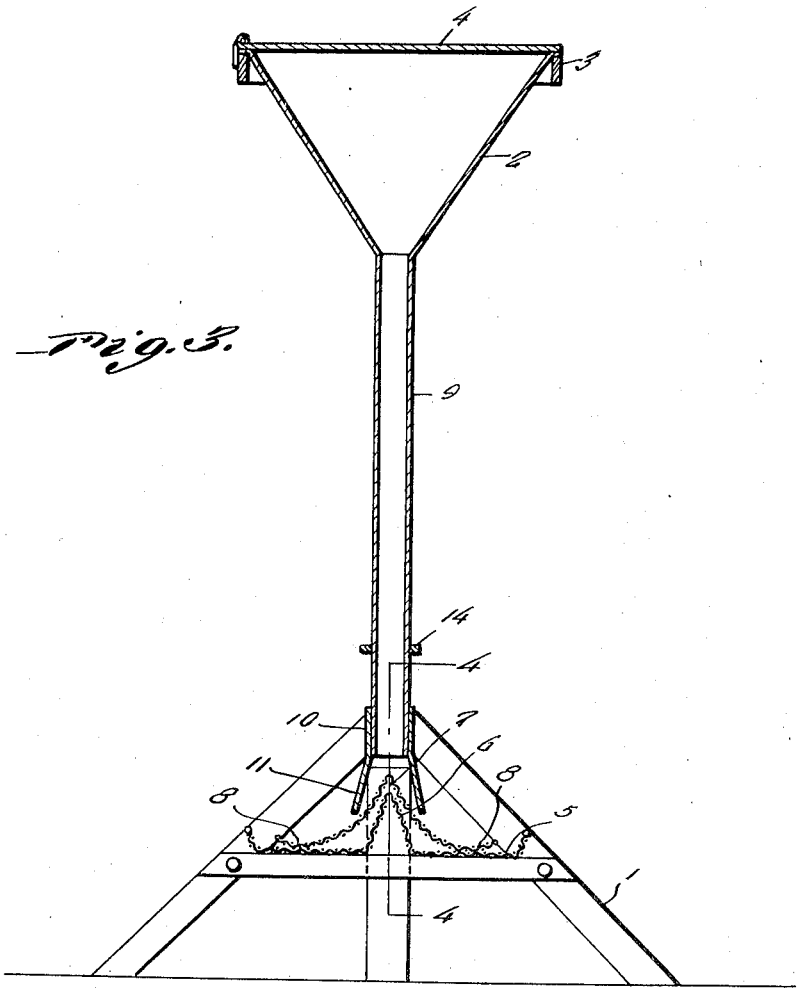
Figure 3 is a vertical sectional view through the invention, taken substantially on the line 3—3 of Fig. 1.

Referring now to the drawings in detail, it will be seen that the embodiment of the invention which has been illustrated comprises a supporting frame or structure 1 of suitable material in the upper portion of which a plurality of hoppers 2 are mounted. The supporting structure 1 includes a substantially rectangular frame 3 in which the hoppers 2 are mounted. A hinged cover 4 of suitable material, preferably metal, is provided for the hoppers 2. Of course, the hoppers 2 are for the reception of the feed.

Mounted in the lower portion of the supporting structure 1 and extending beneath the series of hoppers 2 is a screen trough 5. The trough 5 comprises a substantially V-shaped longitudinally extending partition 6. Mounted on the partition 6 and straddling same is a substantially V-shaped foraminous agitator 7. The agitator 7 comprises upwardly curved marginal portions or wings 8 which rest on the bottom of the screen trough 5 on opposite sides of the partition 6.

Figure 4:
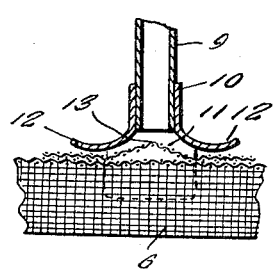
Figure 4 is a detail view in vertical section, taken substantially on the line 4—4 of Fig. 3.

Depending from the hoppers 2 are feed tubes 9 which terminate at their lower ends above the central portion of the agitator 7. Mounted for vertical sliding adjustment on the lower end portions of the tubes 9 are feed regulating nozzles 10. The nozzles 10, as shown to advantage in Fig. 3 of the drawings, include outwardly directed plates 11 which extend on opposite sides of the agitator 7 and the partition 6. Referring now to Fig. 4 of the drawings, it will be seen that the nozzles 10 further include laterally projecting, upwardly curved tongues 12. At spaced points, the upper portion of the agitator 7 is formed to provide spreaders 13 beneath the tubes 9. The lower end portions of the tubes 9 extend through openings which are provided therefor in a metallic strip or plate 14 which is mounted longitudinally in the supporting structure 1 above the trough 5.

It is thought that the operation of the device will be readily apparent from a consideration of the foregoing. The feed drops by gravity from the hoppers 2 through the tubes 9 and flows from under the nozzles 10 onto the agitator 7 and into the screen trough 5. The quantity of feed thus discharged is controlled by the nozzles 10 and this may be conveniently regulated as desired by raising or lowering said nozzles on the tubes 9. As the chickens pick the feed from the agitator 7 said agitator is vibrated in a manner to cause more feed to drop from the tubes 9.

It is believed that the many advantages of a poultry feeder constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

1. A poultry feeder comprising a supporting structure, a plurality of hoppers mounted in said supporting structure, discharge tubes depending from said hoppers, a foraminous trough mounted in the supporting structure beneath the tubes for receiving feed therefrom, said trough including a substantially V-shaped partition extending beneath the tubes, and nozzles mounted for sliding adjustment on the lower end portions of the tubes and including depending wing members movable toward and from the sides of the partition for controlling the discharge of the feed into the trough.

2. A poultry feeder comprising a supporting structure, a plurality of hoppers mounted in said supporting structure, discharge tubes depending from said hoppers, a trough mounted in the supporting structure beneath the tubes for receiving feed therefrom, said trough including a substantially V-shaped partition extending beneath the tubes, and nozzles mounted for sliding adjustment on the lower end portions of the tubes for controlling the discharge of the feed into the trough, said nozzles including outwardly inclined plates extending on opposite sides of the partition and further including laterally projecting wings extending above said partition.

3. A poultry feeder comprising a supporting structure, a plurality of hoppers for the reception of feed mounted in said supporting structure, discharge tubes depending from the hoppers, a trough mounted in the supporting structure beneath the discharge tubes, said trough including a substantially V-shaped partition extending beneath the lower ends of the discharge tubes, a substantially V-shaped foraminous agitator mounted on the partition and straddling same, said agitator including marginal portions resting on the bottom of the trough on opposite sides of the partition, said trough being adapted to receive the feed from the discharge tubes, and nozzles mounted for vertical adjustment on the lower end portions of said discharge tubes for controlling the discharge of the feed onto the agitator and into the trough.

4. A poultry feeder comprising a supporting structure, a plurality of hoppers for the reception of feed mounted in said supporting structure, discharge tubes depending from the hoppers, a trough mounted in the supporting structure beneath the discharge tubes, said trough including a substantially V-shaped partition extending beneath the lower ends of the discharge tubes, a substantially V-shaped foraminous agitator mounted on the partition and straddling same, said agitator including marginal portions resting on the bottom of the trough on opposite sides of the partition, said trough being adapted to receive the feed from the discharge tubes, and nozzles mounted for vertical adjustment on the lower end portions of said discharge tubes for controlling the discharge of the feed onto the agitator and into the trough, said nozzles including outwardly inclined plates extending on opposite sides of the substantially V-shaped agitator, said nozzles further including laterally projecting wings extending longitudinally above the central portion of the agitator.

5. A poultry feeder comprising a supporting structure including a substantially rectangular frame, a metallic strip extending from end to end of the supporting structure, a plurality of hoppers mounted in the frame, a cover for said hoppers hingedly mounted on the frame, discharge tubes depending from the hoppers and extending through the metallic strip, a trough of foraminous material mounted in the lower portion of the supporting structure below the discharge tubes for receiving feed therefrom, said trough including an integral, substantially V-shaped partition extending below the discharge tubes, a substantially V-shaped foraminous agitator mounted on the partition and straddling same and including longitudinal marginal portions resting on the bottom of the trough on opposite sides of said partition, said agitator being adapted to receive the feed from the discharge tubes, and nozzles mounted for vertical sliding adjustment on the lower end portions of the discharge tubes for controlling the flow of the feed onto the agitator and into the trough, said nozzles including outwardly inclined plates extending on opposite sides of the agitator and further including laterally projecting wings extending longitudinally above the central portion of said agitator.

ALBERT BROWN.